(12) United States Patent
Park

(10) Patent No.: US 11,292,599 B2
(45) Date of Patent: Apr. 5, 2022

(54) DISC-SHAPED AIRCRAFT

(71) Applicant: Myung Joon Park, Seoul (KR)

(72) Inventor: Myung Joon Park, Seoul (KR)

( * ) Notice: Subject to any disclaimer, the term of this patent is extended or adjusted under 35 U.S.C. 154(b) by 0 days.

(21) Appl. No.: 16/973,133

(22) PCT Filed: Feb. 18, 2019

(86) PCT No.: PCT/KR2019/001909
§ 371 (c)(1),
(2) Date: Dec. 8, 2020

(87) PCT Pub. No.: WO2019/240351
PCT Pub. Date: Dec. 19, 2019

(65) Prior Publication Data
US 2021/0253247 A1      Aug. 19, 2021

(30) Foreign Application Priority Data
Jun. 14, 2018   (KR) .................. KR10-2018-0068048

(51) Int. Cl.
*B64C 39/00*     (2006.01)
*B64C 39/06*     (2006.01)
(Continued)

(52) U.S. Cl.
CPC ............... *B64C 39/06* (2013.01); *B64C 3/38* (2013.01); *B64C 19/00* (2013.01); *B64C 21/025* (2013.01)

(58) Field of Classification Search
CPC .......... B64C 39/06; B64C 3/38; B64C 19/00; B64C 21/025; B64C 39/001; B64C 2201/027
See application file for complete search history.

(56) References Cited

U.S. PATENT DOCUMENTS 2,927,746 A * 3/1960 Mellen .................. B64C 39/064
                                                                    244/12.2
3,107,071 A * 10/1963 Wessels ................ B64C 39/001
                                                                    244/23 R
(Continued)

FOREIGN PATENT DOCUMENTS

WO       2009/027742 A1    3/2009
WO       2011/010155 A2    1/2011

*Primary Examiner* — Brian M O'Hara
(74) *Attorney, Agent, or Firm* — Korus Patent, LLC; Seong Ii Jeong

(57) ABSTRACT

Provided is a disc-shaped aircraft including a rotatable disc-shaped wing inclined downward from a center to an edge of the wing and including a through hole vertically penetrating through a center of the wing, a body provided in a space under the wing, a driving mechanism for providing rotary power to the wing, a connector including an end connected to a side of the wing forming the through hole, and another end connected to the driving mechanism to transmit rotary power to the wing, a main channel provided between the wing and the body to serve as a passage for a gas sucked into the through hole, an ejection hole provided between a lower end of the wing and the body to eject the gas flowing along the main channel, downward, and a flight controller for adjusting an ejection amount of the gas ejected from the ejection hole, by changing a shape of the main channel by adjusting a height of the wing.

10 Claims, 5 Drawing Sheets

(51) Int. Cl.
*B64C 3/38* (2006.01)
*B64C 19/00* (2006.01)
*B64C 21/02* (2006.01)

(56) References Cited

U.S. PATENT DOCUMENTS

| | | |
|---|---|---|
| 5,503,351 A | 4/1996 | Vass |
| 6,016,991 A * | 1/2000 | Lowe, Jr. .................. B64B 1/00 |
| | | 244/12.2 |
| 6,050,520 A * | 4/2000 | Kirla ....................... B64C 29/00 |
| | | 244/10 |
| 6,270,036 B1 * | 8/2001 | Lowe, Jr. .................. B64B 1/00 |
| | | 244/12.2 |
| 2016/0376002 A1 * | 12/2016 | Davidson .............. B64C 39/001 |
| | | 244/23 A |

\* cited by examiner

DISC-SHAPED AIRCRAFT

TECHNICAL FIELD

The present invention relates to a disc-shaped aircraft having a disc shape and capable of flying.

BACKGROUND ART

In general, aircrafts obtain lift by using wings while moving in the air. Helicopters or ships obtain lift or thrust by rotating a propeller in the air or the water.

On the contrary, disc-shaped aircrafts may not obtain lift by using wings due to the structure thereof and thus currently obtain lift by using ejection force generated by strongly ejecting the air downward.

However, huge energy is required to obtain sufficient lift by using only the ejection force.

In addition, the helicopters using the propeller are noisy and dangerous because blades of the propeller rotate at high speed.

DETAILED DESCRIPTION OF THE INVENTION

Technical Problem

The present invention provides a disc-shaped aircraft capable of generating lift by ejecting a gas downward due to rotation of a disc-shaped wing. The present invention also provides a safe aircraft capable of reducing noise by using a disc-shaped wing without using a propeller including blades.

Technical Solution

According to an aspect of the present invention, there is provided a disc-shaped aircraft including a rotatable disc-shaped wing inclined downward from a center to an edge of the wing and including a through hole vertically penetrating through a center of the wing, a body provided in a space under the wing, a driving mechanism for providing rotary power to the wing, a connector including an end connected to a side of the wing forming the through hole, and another end connected to the driving mechanism to transmit rotary power to the wing, a main channel provided between the wing and the body to serve as a passage for a gas sucked into the through hole, an ejection hole provided between a lower end of the wing and the body to eject the gas flowing along the main channel, downward, and a flight controller for adjusting an ejection amount of the gas ejected from the ejection hole, by changing a shape of the main channel by adjusting a height of the wing.

The disc-shaped aircraft may further include a first ejector and a second ejector provided at both sides of a vertical plane passing through a center of the body, provided as pipe-shaped channels connected to the body, and capable of ejecting the gas sucked from the through hole.

The first and second ejectors may include a plurality of unit ejectors capable of enabling multidirectional joint motion relative to each other to eject the gas in multiple directions.

The first and second ejectors may individually include at least one joint capable of enabling multidirectional joint motion to eject the gas in multiple directions.

The body may include a first sub-channel for supplying the gas sucked from the through hole, to the first ejector, a second sub-channel for supplying the gas sucked from the through hole, to the second ejector, a first flow rate adjuster provided in the first sub-channel to adjust a flow rate of the first sub-channel, and a second flow rate adjuster provided in the second sub-channel to adjust a flow rate of the second sub-channel, and the flight controller may adjust a gas ejection amount of the first ejector by controlling the first flow rate adjuster, and adjust a gas ejection amount of the second ejector by controlling the second flow rate adjuster.

The flight controller may differently adjust gas ejection amounts of the first and second ejectors depending on a rotation direction of the wing.

The flight controller may reduce an amount of the gas flowing into the main channel and increase an amount of the gas flowing into the first and second sub-channels by reducing the height of the wing.

The connector may include a plurality of blades, and the blades may be provided to suck the gas downward from above the wing when the wing rotates.

The disc-shaped aircraft may further include a remote controller for remotely controlling the flight controller.

Advantageous Effects

Using a disc-shaped aircraft according to an embodiment of the present invention, lift may be efficiently obtained by ejecting a gas downward while rotating a disc-shaped wing. In addition, because the disc-shaped wing is rotated instead of using a propeller including blades, safety may be achieved and noise due to high-speed rotation may be reduced.

MODE OF THE INVENTION

Hereinafter, the present invention will be described in detail by explaining embodiments of the invention with reference to the attached drawings. The invention may, however, be embodied in many different forms and should not be construed as being limited to the embodiments set forth herein; rather, these embodiments are provided so that this disclosure will be thorough and complete, and will fully convey the concept of the invention to one of ordinary skill in the art. The terminology used herein is for the purpose of describing particular embodiments and is not intended to limit the invention. As used herein, the singular forms "a", "an", and "the" are intended to include the plural forms as well, unless the context clearly indicates otherwise. It will be understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. It will be further understood that, although the terms first, second, third, etc., may be used herein to describe various elements, these elements should not be limited by these terms. These terms are only used to distinguish one element from another.

Reference will now be made in detail to embodiments of the present invention, examples of which are illustrated in the accompanying drawings.

Figure 1:
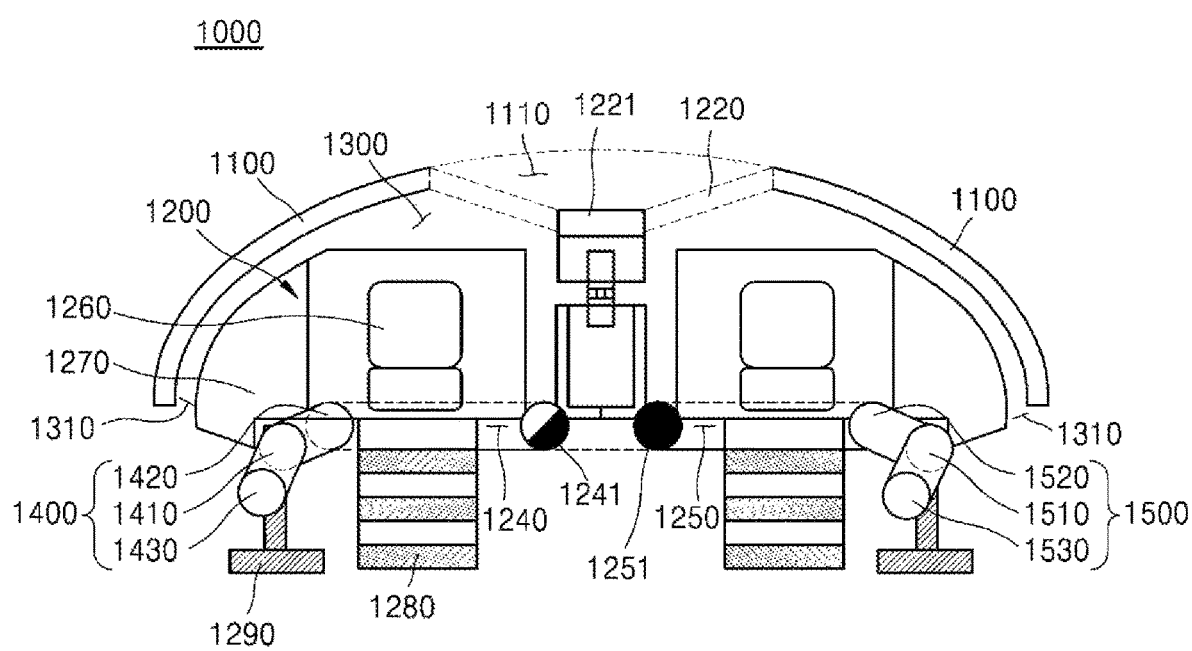
FIG. 1 is a rear cross-sectional view showing a landing state of a disc-shaped aircraft according to an embodiment of the present invention.
Figure 2:
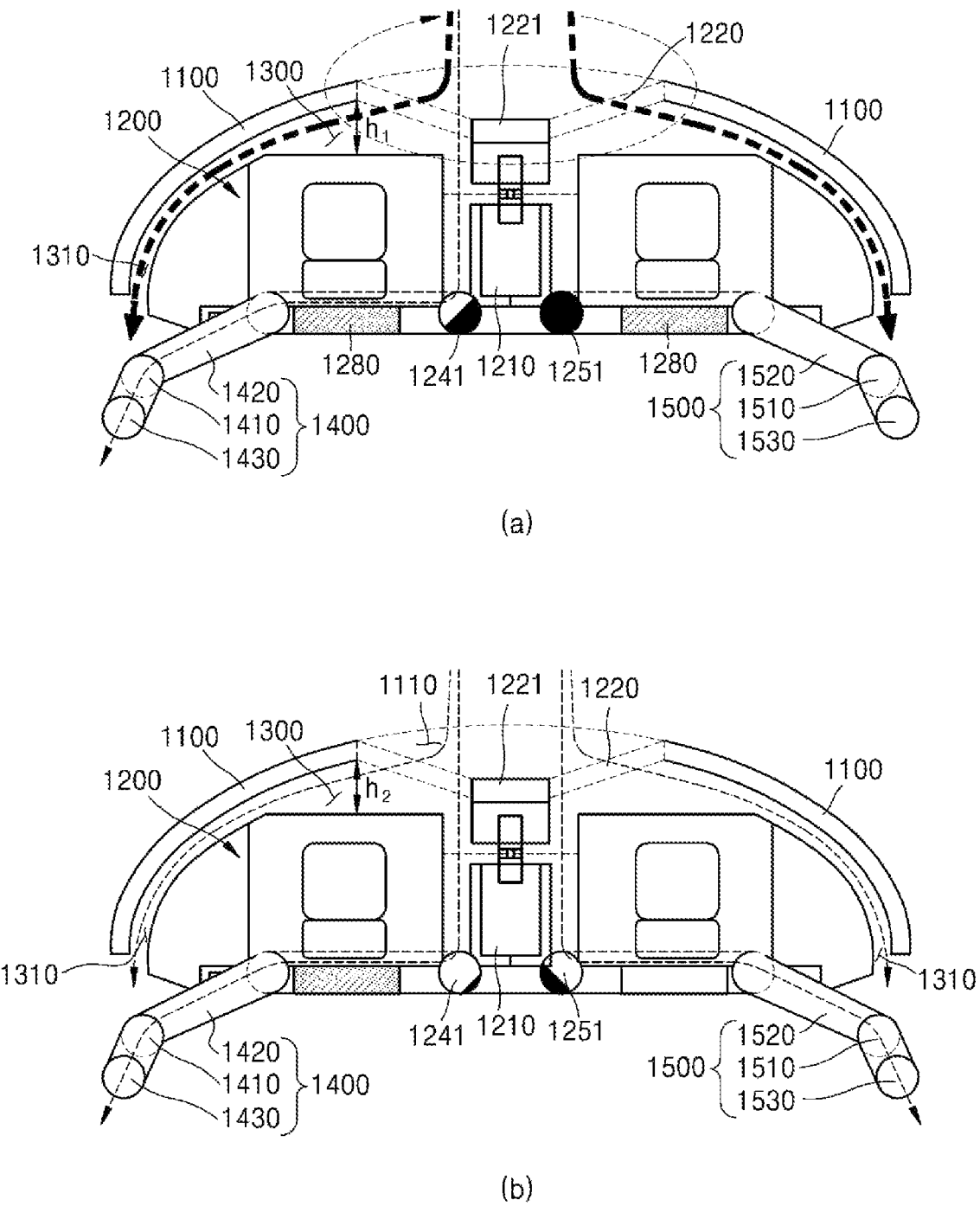
FIG. 2 includes rear cross-sectional views showing a flying state of a disc-shaped aircraft according to an embodiment of the present invention.

FIG. 1 is a rear cross-sectional view showing a landing state of a disc-shaped aircraft 1000 according to an embodiment of the present invention. FIG. 2 includes rear cross-sectional views showing a flying state of the disc-shaped aircraft 1000 according to an embodiment of the present invention.

Referring to FIGS. 1 and 2, the disc-shaped aircraft 1000 according to an embodiment of the present invention is an aircraft flying in the air by using lift due to rotation of a wing 1100 and thrust due to ejection of a gas. The disc-shaped aircraft 1000 may include the wing 1100, a body 1200, a driving mechanism 1210, and a flight controller.

The wing 1100 may be provided in a disc shape inclined downward from the center to the edge thereof. The wing 1100 in a disc shape may provide additional lift to the disc-shaped aircraft 1000 during flight due to the ambient air flowing around the disc shape.

The wing 1100 may rotate at high speed about a virtual axis vertically penetrating through the center thereof. The wing 1100 may generate lift force while rotating, to lift the aircraft 1000. A through hole 1110 may be provided at the center of the wing 1100 to vertically penetrate therethrough. The gas above the wing 1100 may flow into the through hole 1110 and then downward from the wing 1100 due to rotation of the wing 1100.

The body 1200 may provide a structure to which the wing 1100 may be rotatably coupled, and be an element for accommodating various components of the aircraft 1000. The body 1200 may be provided in a space under the wing 1100. The body 1200 may include boarding ramps 1280 for allowing users to access the body 1200, and landing gears 1290 for assisting the aircraft 1000 in landing.

The boarding ramps 1280 may be provided in the form of steps, and be accommodated in a lower portion of the body 1200 during flight and protrude downward from the body 1200 after landing to allow the users to enter or exit the body 1200.

The landing gears 1290 may also be accommodated in the lower portion of the body 1200 during flight and protrude downward from the body 1200 for landing to support the aircraft 1000 from below and assist in safe landing. The body 1200 may have an internal space. The internal space may accommodate, for example, seats 1260 for the users, and batteries 1270 for supplying power to the driving mechanism 1210. A camera (not shown) may be provided at a side of the body 1200, and a monitor (not shown) may be provided in the internal space of the body 1200. The users may monitor an external environment by using the camera and/or the monitor.

The driving mechanism 1210 may provide rotary power to the wing 1100. The driving mechanism 1210 may be provided at a side of the body 1200. In the current embodiment, it is assumed that the driving mechanism 1210 is provided at the center of the body 1200. The driving mechanism 1210 may include an electric motor. The wing 1100 and the driving mechanism 1210 may be connected to each other via a connector 1220. An end of the connector 1220 may be connected to a side of the wing 1100 forming the through hole 1110. Another end of the connector 1220 may be connected to a side of a rotating shaft (not shown) of the driving mechanism 1210 to transmit rotary power to the wing 1100. The connector 1220 may include a plurality of blades, and the blades may be provided to suck the gas downward from above the wing 1100 when the wing 1100 rotates. For example, the connector 1220 may have a fan blade shape for inducing the gas to flow from above to below the wing 1100. A height adjuster 1221 for adjusting a height h1 or h2 of the wing 1100 from the body 1200 may be provided between the connector 1220 and the driving mechanism 1210. The other end of the connector 1220 may be connected to the height adjuster 1221, and the height adjuster 1221 may move vertically from the driving mechanism 1210. As such, the relative height h1 or h2 of the connector 1220 and the wing 1100 connected to the connector 1220 from the driving mechanism 1210 may be adjusted. A flight controller (not shown) to be described below may adjust the relative height h1 or h2 between the connector 1220/the wing 1100 and the body 1200 by controlling motion of the height adjuster 1221 relative to the driving mechanism 1210.

The flight controller may be an element for controlling flight of the aircraft 1000. The flight controller may be provided in the body 1200. The flight controller may be implemented in various forms for controlling components of the aircraft 1000, e.g., a circuit board, an integrated circuit chip, a series of computer programs installed in hardware, firmware, or software.

The disc-shaped aircraft 1000 according to an embodiment of the present invention may include a main channel 1300, a first sub-channel 1240, and a second sub-channel 1250 through which the gas flows. The flight controller may control flight of the aircraft 1000 by adjusting the amount of the gas flowing in the channels.

The wing 1100 and the body 1200 may be spaced apart from each other to form the main channel 1300 through which the gas sucked into the through hole 1110 may flow downward. The gas flowing along the main channel 1300 may be ejected downward through an ejection hole 1310 provided at a lower end of the main channel 1300. The aircraft 1000 may obtain thrust in an upward direction due to reaction force of ejection force. An outer surface of the body 1200 may be inclined to correspond to an inner surface of the wing 1100. In addition, the outer surface of the body 1200 may be provided close to the inner surface of the wing 1100. Therefore, the ejection hole 1310 may have a small cross-sectional area and thus the ejection force of the gas may be strong.

As described above, the flight controller may adjust the height h1 or h2 of the wing 1100. When the height h1 or h2 of the wing 1100 is adjusted, the main channel 1300 may be changed in shape. The ejection force of the gas ejected from the ejection hole 1310 may vary depending on a ratio of a cross-sectional area of a gas inlet of the main channel 1300 to a cross-sectional area of a gas outlet of the main channel 1300. For example, when the height h1 of the wing 1100 is increased, the cross-sectional area of the gas inlet may be increased and, in contrast, the cross-sectional area of the ejection hole 1310 may be reduced, thereby increasing an ejection amount of the gas (see (a) of FIG. 2). When the height h2 of the wing 1100 is reduced, the cross-sectional area of the gas inlet may be reduced and, in contrast, the cross-sectional area of the ejection hole 1310 may be increased, thereby reducing the ejection amount of the gas (see (b) of FIG. 2). As such, the flight controller may adjust the height h1 or h2 of the wing 1100 of the aircraft 1000 to change the shape of the main channel 1300, and thus increase or reduce the ejection amount of the gas ejected from the ejection hole 1310 to control rise and fall of the aircraft 1000.

Figure 3:
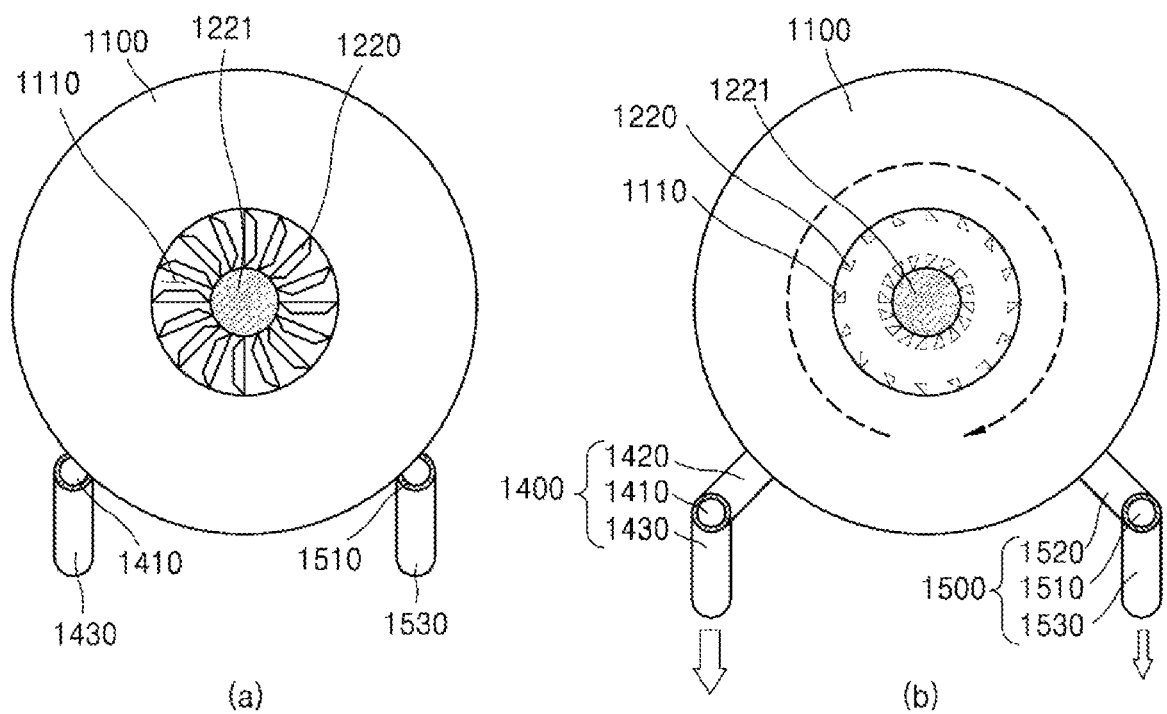
FIG. 3 includes top views showing a landing state and a flying state of a disc-shaped aircraft according to an embodiment of the present invention.
Figure 4:
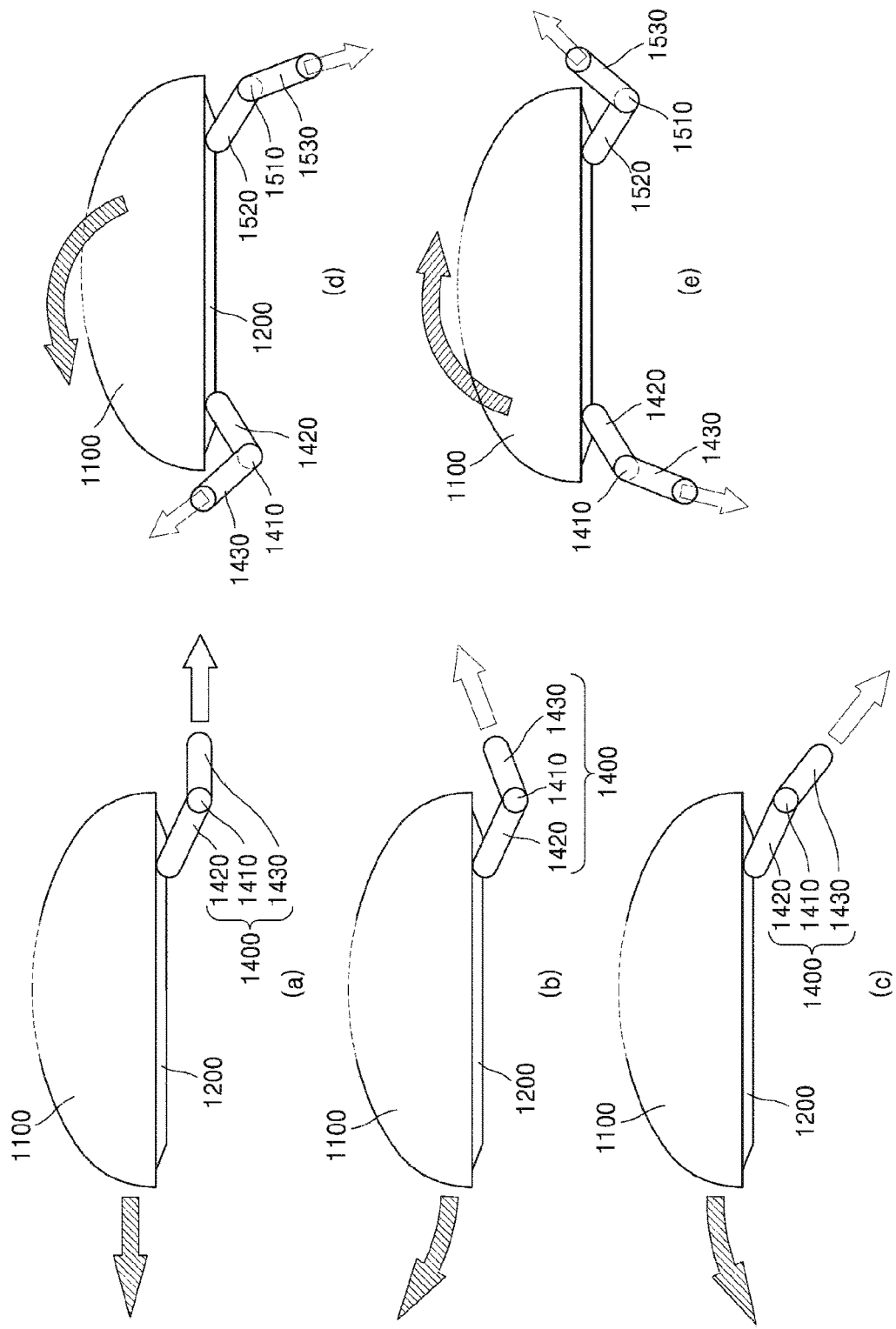
FIG. 4 includes side views showing multidirectional motion of a disc-shaped aircraft according to an embodiment of the present invention.

FIG. 3 includes top views showing a landing state and a flying state of the disc-shaped aircraft 1000 according to an embodiment of the present invention. FIG. 4 includes side views showing multidirectional motion of the disc-shaped aircraft 1000 according to an embodiment of the present invention.

Referring to FIGS. 3 and 4, the flight controller may control the aircraft 1000 to fly in various directions. In this regard, the aircraft 1000 may include a first ejector 1400 and a second ejector 1500. The first and second ejectors 1400 and 1500 may be elements capable of ejecting the gas flowing into the through hole 1110, in various directions including side directions of the aircraft 1000. The first and second ejectors 1400 and 1500 may be provided at both sides of a vertical plane passing through the center of the body 1200. The first and second ejectors 1400 and 1500 may be pipe-shaped channels connected to the body 1200. The first and second ejectors 1400 and 1500 may be inserted into the body 1200 when the aircraft 1000 lands, and protrude from the body 1200 when the aircraft 1000 flies. As such, when the aircraft 1000 lands, the first and second ejectors 1400 and 1500 may not collide with the ground. However, during flight, the first and second ejectors 1400 and 1500 change positions according to an ejection direction of the gas and, in this case, may collide with portions of the body 1200. Therefore, the first and second ejectors 1400 and 1500 may additionally protrude from the body 1200 during flight to change positions away from the body 1200, and thus may eject the gas in multiple directions without colliding with the body 1200.

The first ejector 1400 and/or the second ejector 1500 may include at least one joint 1410 or 1510. In this case, the first ejector 1400 and/or the second ejector 1500 may include a plurality of unit ejectors 1420 and 1430, or 1520 and 1530 provided at both sides of the joint 1410 or 1510 to enable multidirectional joint motion relative to each other. In the following description, for convenience of explanation, it is assumed that each of the first and second ejectors 1400 and 1500 includes one joint 1410 or 1510. The joint 1410 or 1510 may be provided in the middle of the first or second ejector 1400 or 1500. Herein, among the plurality of unit ejectors 1420 and 1430 included in the first ejector 1400, a unit ejector provided between the joint 1410 and the body 1200 is called a first unit ejector 1420 and the other unit ejector is called a second unit ejector 1430. In addition, among the plurality of unit ejectors 1520 and 1530 included in the second ejector 1500, a unit ejector provided between the joint 1510 and the body 1200 is called a third unit ejector 1520 and the other unit ejector is called a fourth unit ejector 1530.

The flight controller may adjust the ejection direction of the gas by adjusting a relative angle formed between the first and second unit ejectors 1420 and 1430 and/or a relative angle formed between the third and fourth unit ejectors 1520 and 1530 by controlling the joints 1410 and 1510. Specifically, the first and third unit ejectors 1420 and 1520 may extend almost backward from the body 1200, and the first and third unit ejectors 1420 and 1520 and the second and fourth unit ejectors 1430 and 1530 may perform joint motion such that the angles formed between the first and third unit ejectors 1420 and 1520 and the second and fourth unit ejectors 1430 and 1530 may be variously changed to adjust the ejection direction of the gas. For example, when the second and fourth unit ejectors 1430 and 1530 are bent horizontally backward from the first and third unit ejectors 1420 and 1520 to eject the gas in a backward and horizontal direction of the aircraft 1000, the aircraft 1000 may obtain thrust in a forward direction (see (a) of FIG. 4). When the second and fourth unit ejectors 1430 and 1530 are bent backward and upward from the first and third unit ejectors 1420 and 1520 to eject the gas in a backward and upward direction of the aircraft 1000, a front end of the aircraft 1000 may be steered upward (see (b) of FIG. 4). When the second and fourth unit ejectors 1430 and 1530 are bent backward and downward from the first and third unit ejectors 1420 and 1520 to eject the gas in a backward and downward direction of the aircraft 1000, a front end of the aircraft 1000 may be steered downward (see (c) of FIG. 4). When the second unit ejector 1430 is bent backward and upward from the first unit ejector 1420 to eject the gas in a backward and upward direction of the aircraft 1000 and the fourth unit ejector 1530 is bent backward and downward from the third unit ejector 1520 to eject the gas in a backward and downward direction of the aircraft 1000, the aircraft 1000 may rotate in a counterclockwise direction about a virtual rotation axis extending along a forward and backward direction of the aircraft 1000 (see (d) of FIG. 4). When the second unit ejector 1430 is bent backward and downward from the first unit ejector 1420 to eject the gas in a backward and downward direction of the aircraft 1000 and the fourth unit ejector 1530 is bent backward and upward from the third unit ejector 1520 to eject the gas in a backward and upward direction of the aircraft 1000, the aircraft 1000 may rotate in a clockwise direction about the virtual rotation axis (see (e) of FIG. 4).

The body 1200 may include the first and second sub-channels 1240 and 1250 to supply the gas to the first and second ejectors 1400 and 1500. The first sub-channel 1240 may supply the air sucked from the through hole 1110, to the first ejector 1400. The second sub-channel 1250 may supply the air sucked from the through hole 1110, to the second ejector 1500. The first and second sub-channels 1240 and 1250 may respectively include a first flow rate adjuster 1241 and a second flow rate adjuster 1251.

The first flow rate adjuster 1241 may be a means for adjusting a flow rate of the gas flowing in the first sub-channel 1240. The first flow rate adjuster 1241 may be provided in the first sub-channel 1240. The second flow rate adjuster 1251 may be a means for adjusting a flow rate of the gas flowing in the second sub-channel 1250. The second flow rate adjuster 1251 may be provided in the second sub-channel 1250. The flight controller may adjust opening levels of the first and second sub-channels 1240 and 1250 by controlling the first and second flow rate adjusters 1241 and 1251, and thus control the flow rates of the gas flowing in the first and second ejectors 1400 and 1500.

Figure 5:
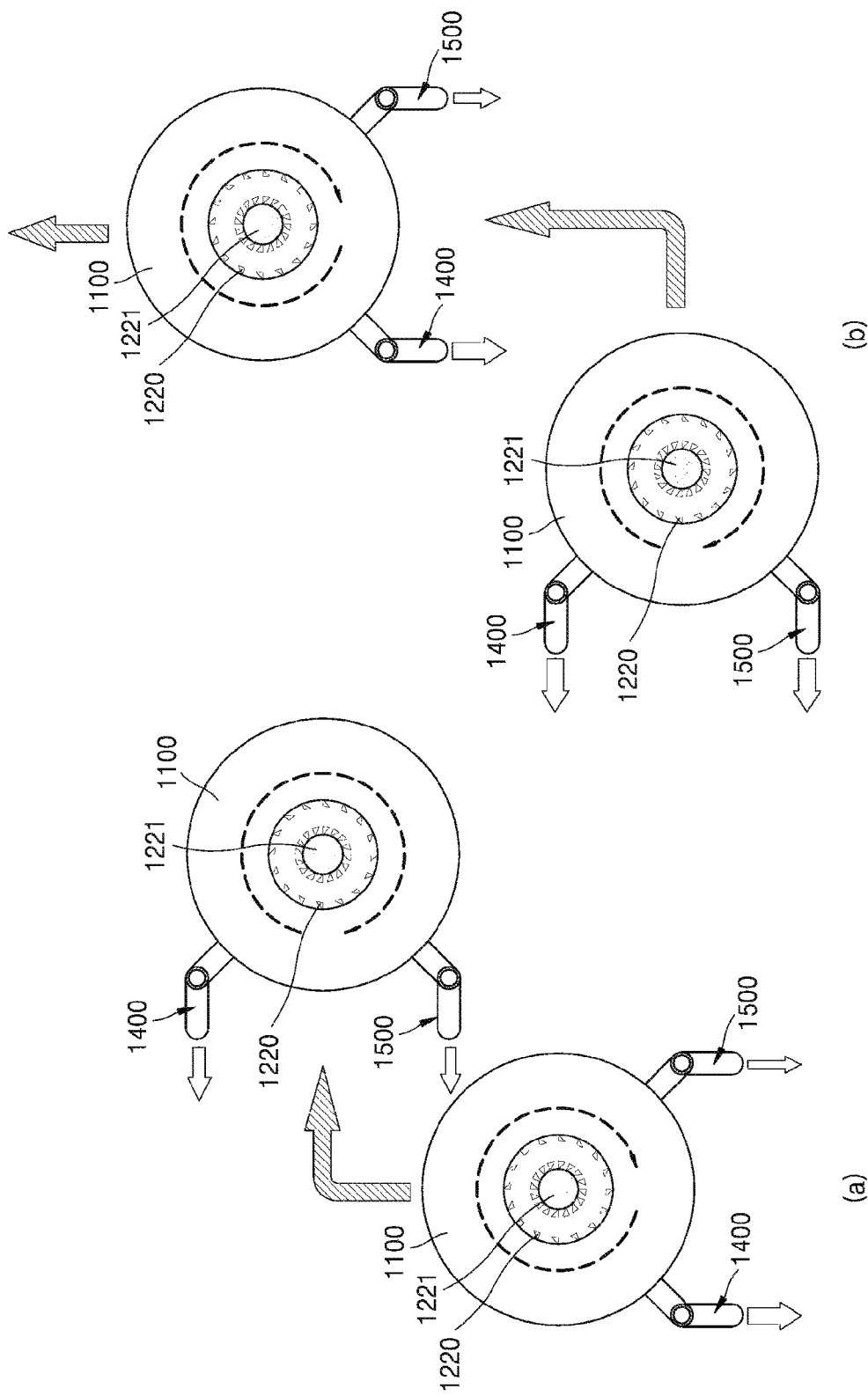
FIG. 5 includes top views showing direction change operations of a disc-shaped aircraft according to an embodiment of the present invention.

FIG. 5 includes top views showing direction change operations of the disc-shaped aircraft 1000 according to an embodiment of the present invention.

Referring to FIG. 5, the flight controller may differently adjust air ejection amounts of the first and second ejectors 1400 and 1500 depending on a rotation direction of the wing 1100. For straight forward motion of the aircraft 1000, gas ejection amounts of the first and second ejectors 1400 and 1500 may differ to offset centrifugal force due to rotation of the wing 1100. For example, when the wing 1100 rotates in a clockwise direction, the gas ejection amount of the first ejector 1400 provided at a left side of a vertical axis extending along a forward and backward direction of the aircraft 1000 may need to be greater than the gas ejection amount of the second ejector 1500 provided at a right side thereof to move the aircraft 1000 straight forward.

In addition, the flight controller may differently adjust the gas ejection amounts of the first and second ejectors 1400 and 1500 for a left or right turn of the aircraft 1000. For example, for a right turn of the aircraft 1000 including the wing 1100 rotating in a clockwise direction, the gas ejection amount of the first ejector 1400 may need to be greater than the gas ejection amount of the second ejector 1500 (see (a) of FIG. 5). For a left turn of the aircraft 1000, the gas ejection amount of the first ejector 1400 may need to be less than or equal to the gas ejection amount of the second ejector 1500 (see (b) of FIG. 5).

The flight controller may reduce the amount of the air flowing into the main channel 1300 and increase the amount of the air flowing into the first and second sub-channels 1240 and 1250 by reducing the height of the wing 1100. Because the main channel 1300 is directly changed in shape due to adjustment of the height of the wing 1100, when the height of the wing 1100 is reduced, the cross-sectional area of the gas inlet of the main channel 1300 may be reduced and thus the amount of the gas flowing into the main channel 1300 may also be reduced. On the contrary, the first and second sub-channels 1240 and 1250 may not be changed in shape due to the height of the wing 1100 and thus the amount of the gas flowing thereinto may not vary even when the height of the wing 1100 is reduced. Therefore, when the height of the wing 1100 is reduced, the amount of the gas flowing into the main channel 1300 may be reduced and the amount of the gas flowing into the first and second sub-channels 1240 and 1250 may be relatively increased. As such, the aircraft 1000 may increase horizontal thrust of the aircraft 1000 by increasing the amount of the gas flowing into the first and second ejectors 1400 and 1500.

The aircraft 1000 according to an embodiment of the present invention may further include a remote controller (not shown) capable of remotely controlling the flight controller. The flight controller and the remote controller may individually include a communication module (not shown) to communicate each other, and the flight controller may be controlled using the remote controller to control flight of the aircraft 1000.

Operation examples of the disc-shaped aircraft 1000 according to an embodiment of the present invention will now be described.

The disc-shaped aircraft 1000 in a landing state may rotate the wing 1100 to take off vertically. As such, the air may flow from above the wing 1100 into the through hole 1110 and then along the main channel 1300 and be ejected downward from the ejection hole 1310 to obtain lift to take off. In this case, the flight controller may increase the amount of the gas flowing into the main channel 1300 to obtain higher lift by controlling the height adjuster 1221 to increase the height of the wing 1100 and controlling the first and second flow rate adjusters 1241 and 1251 to reduce cross-sectional areas of the first and second sub-channels 1240 and 1250 and reduce the amount of the gas flowing thereinto. When the disc-shaped aircraft 1000 flies, the flight controller may increase the amount of the gas flowing into the first and second sub-channels 1240 and 1250 to obtain higher horizontal thrust by controlling the joints 1410 and 1510 of the first and second ejectors 1400 and 1500 to set a gas ejection direction and determine a direction of the aircraft 1000, controlling the height adjuster 1221 to reduce the height of the wing 1100, and controlling the first and second flow rate adjusters 1241 and 1251 to open the first and second sub-channels 1240 and 1250. When the disc-shaped aircraft 1000 lands, the flight controller may gradually stop rotation of the wing 1100, reduce the height of the wing 1100, reduce the amount of the gas ejected from the first and second ejectors 1400 and 1500, and protrude the landing gears 1290 from the lower portion of the body 1200, thereby achieving safe landing.

Effects of the disc-shaped aircraft 1000 according to an embodiment of the present invention will now be described.

The disc-shaped aircraft 1000 according to an embodiment of the present invention may easily take off by obtaining lift by rotating the wing 1100 and ejecting the gas downward through the ejection hole 1310.

Furthermore, the aircraft 1000 may include the first and second ejectors 1400 and 1500 capable of ejecting the gas in multiple directions, to fly in various directions.

In addition, the aircraft 1000 may include the disc-shaped wing 1100 to reduce noise due to high-speed rotation compared to an aircraft including propeller-shaped wings, and may not use blades to achieve safety.

Besides, the aircraft 1000 may flexibly change a flight mode thereof by adjusting the amounts of the gas ejected from the ejection hole 1310 and the first and second ejectors 1400 and 1500 by adjusting the height of the wing 1100.

While the present invention has been particularly shown and described with reference to embodiments thereof, it will be understood by one of ordinary skill in the art that various changes in form and details may be made therein without departing from the spirit and scope of the present invention as defined by the following claims.

The invention claimed is:

1. A disc-shaped aircraft comprising:
   a rotatable disc-shaped wing inclined downward from a center to an edge of the wing and comprising a through hole vertically penetrating through the center of the wing;
   a body provided in a space under the wing;
   a driving mechanism for providing rotary power to the wing;
   a connector comprising an end connected to a side of the wing forming the through hole, and another end connected to the driving mechanism to transmit rotary power to the wing;
   a main channel provided between the wing and the body to serve as a passage for a gas sucked into the through hole;
   an ejection hole provided between a lower end of the wing and the body to eject the gas flowing along the main channel, downward; and
   a flight controller for adjusting an ejection amount of the gas ejected from the ejection hole, by changing a shape of the main channel by adjusting a height of the wing.

2. The disc-shaped aircraft of claim 1, further comprising a first ejector and a second ejector provided at both sides of a vertical plane passing through a center of the body, provided as pipe-shaped channels connected to the body, and capable of ejecting the gas sucked from the through hole.

3. The disc-shaped aircraft of claim 2, wherein the first and second ejectors comprise a plurality of unit ejectors capable of enabling multidirectional joint motion relative to each other to eject the gas in multiple directions.

4. The disc-shaped aircraft of claim 2, wherein the body comprises:
   a first sub-channel for supplying the gas sucked from the through hole, to the first ejector;

a second sub-channel for supplying the gas sucked from the through hole, to the second ejector;

a first flow rate adjuster provided in the first sub-channel to adjust a flow rate of the first sub-channel; and a second flow rate adjuster provided in the second sub-channel to adjust a flow rate of the second sub-channel, and wherein the flight controller adjusts a gas ejection amount of the first ejector by controlling the first flow rate adjuster, and adjusts a gas ejection amount of the second ejector by controlling the second flow rate adjuster.

5. The disc-shaped aircraft of claim 4, wherein the flight controller reduces an amount of the gas flowing into the main channel and increases an amount of the gas flowing into the first and second sub-channels by reducing the height of the wing.

6. The disc-shaped aircraft of claim 2, wherein the flight controller differently adjusts gas ejection amounts of the first and second ejectors depending on a rotation direction of the wing.

7. The disc-shaped aircraft of claim 1, further comprising a first ejector and a second ejector provided at both sides of a vertical plane passing through a center of the body, provided as pipe-shaped channels connected to the body, and capable of ejecting the gas sucked from the through hole.

8. The disc-shaped aircraft of claim 7, wherein the first and second ejectors comprise a plurality of unit ejectors capable of enabling multidirectional joint motion relative to each of her to eject the gas in multiple directions.

9. A disc-shaped aircraft comprising:

a rotatable disc-shaped wing inclined downward from a center to an edge of the wing and comprising a through hole vertically penetrating through the center of the wing;

a body provided in a space under the wing;

a driving mechanism for providing rotary power to the wing;

a connector comprising an end connected to a side of the wing forming the through hole, and another end connected to the driving mechanism to transmit rotary power to the wing;

a main channel provided between the wing and the body to serve as a passage for a gas sucked into the through hole; and an ejection hole provided between a lower end of the wing and the body to eject the gas flowing along the main channel, downward;

wherein the connector comprises a plurality of blades, and wherein the blades are provided to suck the gas downward from above the wing when the wing rotates.

10. The disc-shaped aircraft of claim 1, further comprising a remote controller for remotely controlling the flight controller.

* * * * *